Jan. 3, 1939.  P. DRAKOFF  2,142,350
AUTOMATIC MOTION PICTURE CAMERA FOR RECORDING ACCIDENTS
Filed June 25, 1938
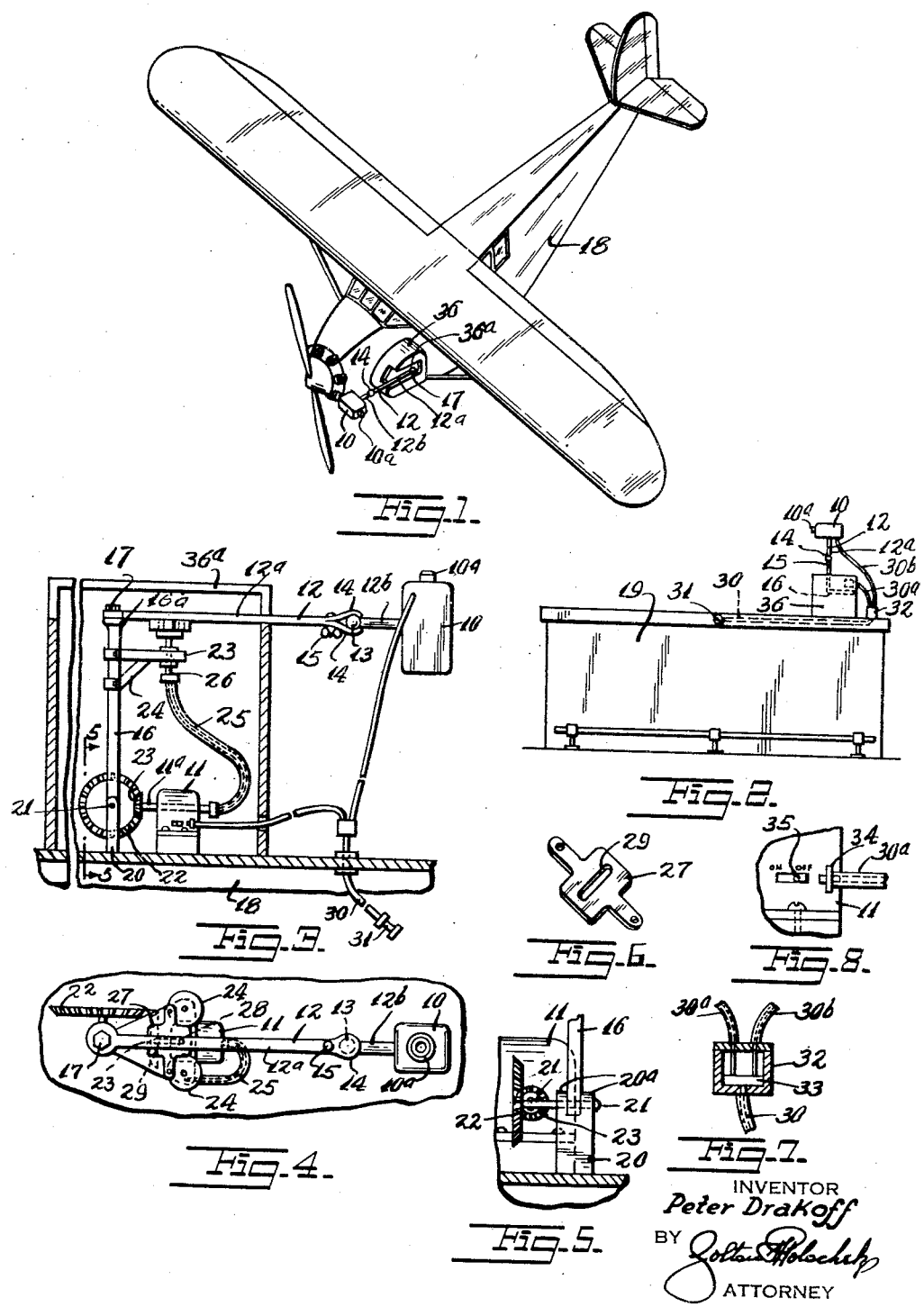
INVENTOR
*Peter Drakoff*
BY
ATTORNEY Patented Jan. 3, 1939

2,142,350

UNITED STATES PATENT OFFICE 2,142,350

AUTOMATIC MOTION PICTURE CAMERA FOR RECORDING ACCIDENTS

Peter Drakoff, New York, N. Y.

Application June 25, 1938, Serial No. 215,763

8 Claims. (Cl. 88—16)

This invention relates to new and useful improvements in an automatic motion picture camera for airplane accident recording, store burglary recording, etc.

More specifically the invention proposes the construction of an automatic motion picture camera characterized by a motion picture camera operable by a cable release and supported upon means for moving the same through a predetermined path for recording pictures of an airplane accident or similar incidents, or other events after the cable release has been operated.

Still further it is proposed to mount the camera upon an arm swivelly supported upon a rod pivotally supported at its bottom end.

It is further proposed to provide a motor for pivoting the rod through a predetermined path while simultaneously oscillating the arm upon the end of the rod to cause the camera to be moved through the said predetermined path and oscillated at the same time.

Still further it is proposed to provide a single cable release connected with the motor and the camera in such a manner that the two will be set in operation as a unit when the release is pressed.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

Fig. 1 is a perspective view of an airplane having an automatic motion picture camera constructed in accordance with this invention mounted thereon.

Fig. 2 is a front elevational view of a bar having an automatic motion picture camera mounted thereon.

Fig. 3 is a side elevational view of the automatic motion picture camera per se.

Fig. 4 is a plan view of Fig. 3.

Fig. 5 is a view looking in the direction of the line 5—5 of Fig. 3.

Fig. 6 is a perspective view of one of the members per se.

Fig. 7 is a sectional view of a portion of a cable release.

Fig. 8 is an enlarged detailed view of the lower right hand corner of the motor showing the connection of the cable release therewith.

The automatic motion picture camera comprises a motion picture camera 10 of the type operable with a cable release. The details of this camera will not be given in connection with this specification as it forms no part of the invention and is of a type generally used in the art.

A means is provided for supporting and moving the camera 10 through a predetermined path and is operable by a motor 11. This means includes an arm 12 for supporting the camera 10. This arm is constructed from separate sections 12ª and 12ᵇ having their adjacent ends universally connected together. The end of the section 12ᵇ is formed with a ball 13. The adjacent end of the section 12ª is formed with a bifurcated end 14 and the arms thereof are engaged on either side of the ball 13. A clamp screw 15 is engaged through the arms of the bifurcated end 14 and is adapted to be tightened for tightly clamping the ends of the section 12ª against the ball 13 on the section 12ᵇ. It is possible to loosen the clamp screw 15 to release the ball 13 so that the section 12ᵇ may be adjusted upon the end of the section 12ª for adjusting the position of the camera to direct the lens 10ª for adjusting the position of the camera to direct the lens 10ª thereof in any desired direction.

A rod 16 extends at right angles to the arm 12 and swivelly supports the same. The upper end of the rod 16 is enlarged at 16ª and the free end of the arm 12 is positioned thereon. A screw 17 freely passes through the end of the arm 12 and threadedly engages into the enlarged end 16ª of the rod 16 for pivotally supporting the arm 12 so that the same may be oscillated on the end of the rod 16.

A means is provided for pivotally supporting the rod 16 upon the side of an airplane 18 as shown in Figs. 1 and 3, or upon a bar 19 as shown in Fig. 2. This means comprises a bracket 20 fixedly attached to a portion of the plane 18 or the bar 19 and which is provided at its top end with a pair of spaced lugs 20ª between which the bottom end of the rod 16 is inserted. A shaft 21 engages through the adjacent portions of the lugs 20ª and the bottom end of the rod 16 and pivotally supports the lower end of the rod 16 upon the top end of the bracket 20.

A means is provided for pivoting the rod to move the camera through said predetermined path. This means comprises a large bevel gear 22 which is fixedly attached to one end of the shaft 21 and pivotally supports the rod 16 upon the bracket 20. The motor 11 has a drive shaft 11ª which has its ends extending from the front and rear sides thereof. The front end of the shaft 11ª has a small bevel gear 23 mounted thereon and meshes with the large bevel gear 22 for causing the rotations of the motor to be transmitted to the large gear 22 to pivot the rod 16 through a distance of substantially 90° until it strikes against a portion of the airplane or bar, depending upon which it is mounted.

A means is provided for simultaneously oscillating the arm 12 upon the end of the rod 16 as the rod is being pivoted through the said predetermined path. This means includes a platform 23 mounted on the upper end of the rod 16 and supported thereon by means of a bracket 24 extending between a portion of the rod 16 and the platform 23. A pair of discs 24 are rotatively supported on the top face of the platform 23 below the arm 12. These discs are disposed on opposite sides of the arm 12 when the arm is extended in a normal position with relation to the rod 16.

A means is provided for rotating one of the discs 24 and comprises a flexible shaft 25 having one of its ends connected to the rear portion of the drive shaft 11ª of the motor 11. The other end of the flexible shaft 25 is connected to a downwardly extended portion 26 of the shaft rotatively supporting one of the discs 24. A means is provided for connecting the driven disc 24 to the other disc 24 to cause the free disc to rotate with the driven disc. This means comprises a link 27 having one of its ends rotatively supported upon the outer edge portion of the driven disc 24. The link 27 has its other end pivotally connected to the outer edge portion of the free disc 24. As the discs 24 rotate the link 27 will be moved through a circular path. A means is provided for connecting the arm 12 to the link 27 for oscillating the same as it moves through its circular path. This means comprises a downwardly extending pin 28 mounted upon the bottom side of the arm 12 and engageable into an elongated slot 29 formed in the link 27 and arranged parallel with the arm 12 for causing the arm to be oscillated when the link 27 moves through its circular path.

As the motor 11 rotates it will cause the arm 16 to be moved through the said predetermined path and its rotations will also cause the arm 12 to be oscillated on the end of the rod 16 for shifting the position of the camera while moving in the predetermined path to record incidents taking place in front of it.

A cable release 30 is provided for setting the camera 10 and motor 11 into operation at a predetermined time. This cable release is of a particular construction permitting the plunger 31 to be released for simultaneously operating the two devices. The end of the cable release 30 extends into a hollow block 32 and has its free end attached to a slide 33 slidably engaged within the hollow block 32. With this construction when the plunger is depressed the block 33 will be moved upward within the hollow block 32. At its other side the block 33 is fixedly connected with the ends of a pair of branch cable releases 30ª and 30ᵇ. The branch 30ᵇ extends into the camera 10 for releasing the same, while the branch 30ª extends to a position on the side of the motor 11. The free end of the branch 30ª extends through a lug 34 mounted upon the side of the motor. A switch 35 is provided for controlling the operation of the motor 11 and when the cable release 30 is extended it will strike against the switch 35 moving the same from the "off" to the "on" position to start the motor 11.

The plunger 31 of the cable release 30 should be mounted within the cabin of a plane, if the device is mounted in a plane, in a position easily accessible to the pilot for permitting the same to be depressed to release the motor and camera in the event the pilot should see an accident coming so that the details of the same may be recorded. If the device is mounted upon a bar the plunger 31 should be mounted in a position easily accessible to the bar tender for permitting the same to be depressed to start the motor 11 and camera 10 to record the incidents of a disturbance taking place in front of the bar.

A cover 36 is provided for extending over the rod 16 and a portion of the arm 12. The cover 36 is provided with a large slot 36ª having a width sufficient to permit the arm 12 to be oscillated while the rod 16 is being pivoted. The cover 36 should be sufficiently large to permit the rod to be pivoted through its 90°.

The operation of this device is as follows:—

In the event of an airplane accident or similar mishap the plunger 31 of the release 30 is manually depressed to cause the motor 11 and the camera 10 to be set in operation. The rotation of the motor 11 will cause the rod 16 to be pivoted about the bracket 20 through a predetermined path of substantially 90° causing the camera 10 to be moved therewith. Simultaneous with the shifting of the rod 16 the arm 12 will be oscillated back and forth upon the end of the rod 16 to change the position of the camera with relation to the path through which it is moved to record the details of the accident as it is taking place.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letter Patent is:—

1. An automatic motion picture camera for airplane accident recording, store burglary recording, and the like, comprising a motion picture camera operable with a cable release, means for supporting and moving said camera through a predetermined path and operable with a motor, a switch for controlling said motor, and a cable release for setting the camera and said motor into operation, said means for supporting and moving said camera comprising an arm supporting said camera, a rod at right angles to said arm and swivelly supporting the same, a means for oscillating said arm on said rod, means for pivotally supporting said rod, and means for moving said rod on its pivot.

2. An automatic motion picture camera for airplane accident recording, store burglary recording, and the like, comprising a motion picture camera operable with a cable release, means for supporting and moving said camera through a predetermined path and operable with a motor, a switch for controlling said motor, and a cable release for setting the camera and said motor into operation, said means for supporting and moving said camera comprising an arm supporting said camera, a rod at right angles to said arm and swivelly supporting the same, a means for oscillating said arm on said rod, means for pivotally supporting said rod, and means for moving said rod on its pivot, said arm being constructed of separate sections having their adjacent ends universally connected together for permitting the lens of said camera to be directed in any desired direction.

3. An automatic motion picture camera for airplane accident recording, store burglary recording, and the like, comprising a motion picture camera operable with a cable release, means for supporting and moving said camera through a predetermined path and operable with a motor, a switch for controlling said motor, and a cable release for setting the camera and said motor into operation, said means for supporting and moving said camera comprising an arm supporting said camera, a rod at right angles to said arm and swively supporting the same, a means for pivotally supporting said rod, and means for moving said rod on its pivot, said swivel support of said arm upon said rod comprising a screw freely passing through the free end of said arm threadedly engaged into the top end of said rod.

4. An automatic motion picture camera for airplane accident recording, store burglary recording, and the like, comprising a motion picture camera operable with a cable release, means for supporting and moving said camera through a predetermined path and operable with a motor, a switch for controlling said motor, and a cable release for setting the camera and said motor into operation, said means for supporting and moving said camera comprising an arm supporting said camera, a rod at right angles to said arm and swively supporting the same, a means for oscillating said arm on said rod, means for pivotally supporting said rod, and means for moving said rod on its pivot, said means for pivoting said rod and said means for oscillating said arm being operable by one motor.

5. An automatic motion picture camera for airplane accident recording, store burglary recording, and the like, comprising a motion picture camera operable with a cable release, means for supporting and moving said camera through a predetermined path and operable with a motor, a switch for controlling said motor, and a cable release for setting the camera and said motor into operation, said means for supporting and moving said camera comprising an arm supporting said camera, a rod at right angles to said arm and swively supporting the same, a means for oscillating said arm on said rod, means for pivotally supporting said rod, and means for moving said rod on its pivot, said means for oscillating said arm comprising a platform mounted on said rod and beneath said arm, a pair of discs rotatively supported on said platform, a means for rotating one of said discs, a link extending between said discs to cause said free disc to rotate with said driven disc to cause said link to move through a circular path, a pin extending from said arm and engaging an elongated slot formed in said link for oscillating said arm as said link moves through said circular path.

6. An automatic motion picture camera for airplane accident recording, store burglary recording, and the like, comprising a motion picture camera operable with a cable release, means for supporting and moving said camera through a predetermined path and operable with a motor, a switch for controlling said motor, and a cable release for setting the camera and said motor into operation, said means for supporting and moving said camera comprising an arm suporting said camera, a rod at right angles to said arm and swively supporting the same, a means for oscillating said arm on said rod, means for pivotally supporting said rod, and means for moving said rod on its pivot, said means for oscillating said arm comprising a platform mounted on said arm, a pair of discs rotatively supported on said platform, a means for rotating one of said discs, a link extending between said discs to cause said free disc to rotate with said driven disc to cause said link to move through a circular path, a pin extending from said arm and engaging an elongated slot formed in said link for oscillating said arm as said link moves through said circular path, said means for rotating said disc comprising a flexible shaft connected at one end with said disc and having its other end connected with one end of the drive shaft of said motor.

7. An automatic motion picture camera for airplane accident recording, store burglary recording, and the like, comprising a motion picture camera operable with a cable release, means for supporting and moving said camera through a predetermined path and operable with a motor, a switch for controlling said motor, and a cable release for setting the camera and said motor into operation, said means for supporting and moving said camera comprising an arm supporting said camera, a rod at right angles to said arm and swively supporting the same, a means for oscillating said arm on said rod, means for pivotally supporting said rod, and means for moving said rod on its pivot, said means for pivoting said rod comprising a bracket, lugs formed on the upper end of said bracket and into which the free end of said rod extends, and a shaft extending between the overlapping portions of said lugs and said rod for pivotally supporting the same.

8. An automatic motion picture camera for airplane accident recording, store burglary recording, and the like, comprising a motion picture camera operable with a cable release, means for supporting and moving said camera through a predetermined path and operable with a motor, a switch for controlling said motor, and a cable release for setting the camera and said motor into operation, said means for supporting and moving said camera comprising an arm supporting said camera, a rod at right angles to said arm and swively supporting the same, a means for oscillating said arm on said rod, means for pivotally supporting said rod, and means for moving said rod on its pivot, said means for pivoting said rod comprising a bracket, lugs formed on the upper end of said bracket and into which the free end of said rod extends, and a shaft extending between the overlapping portions of said lugs and said rod for pivotally supporting the same, said means for pivoting said rod on its pivot comprising a large bevel gear mounted upon the shaft pivotally supporting said rod, a small bevel gear mounted upon one end of the drive shaft of said motor and meshing with said bevel gear.

PETER DRAKOFF.